UNITED STATES PATENT OFFICE.

HERMANN SCHULZE-BERGE, OF PITTSBURG, PENNSYLVANIA, ASSIGNOR OF ONE-HALF TO JESSE H. LIPPINCOTT, OF SAME PLACE.

PROCESS OF ETCHING GLASSWARE.

SPECIFICATION forming part of Letters Patent No. 276,894, dated May 1, 1883.

Application filed November 8, 1882. (No specimens.)

*To all whom it may concern:*

Be it known that I, HERMANN SCHULZE-BERGE, of Pittsburg, in the county of Allegheny and State of Pennsylvania, have invented a new and useful Improvement in Processes of Etching Glassware; and I do hereby declare the following to be a full, clear, and exact description thereof.

My present invention is designed as a modification of a process invented by me, and described in another specification filed by me in the Patent Office contemporaneously with this specification. In that process, as well as in the process I am about to describe, the etching is effected by means of fluorine. The use of liquid hydrofluoric acid for etching is well known, the process employed before my invention consisting in exposing the portions of the glass to be etched to the direct action of hydrofluoric acid, the remainder of the surface of the glass being stopped off or protected by means of a thin film of wax or similar substance capable of resisting the decomposing action of that acid.

In my other specification just referred to I described a process consisting in part of the application to the surface of the glass to be etched of finely-comminuted substances containing fluorine by means of a vehicle consisting of Venice turpentine or other soft or liquid substance capable of retaining the powdered fluoride—such as fluoride of sodium—free from any ingredients which, when exposed to the degree of heat necessary in my process, would discolor or injure the glass, and of sufficient consistency to be applied to the surface of the glass by means of a pen, or a stencil-plate, or a painting-brush, or by means of a rubber stamp having the required words, design, or pattern in relief. Various substances may be employed to compose this vehicle, such as oil, turpentine, and varnish, or glycerine and water.

The compound of fluorine to be used may be any of the fluorides of the fixed alkalies—as fluoride of sodium—with which may be mixed the fluoride of any of the alkaline earths, the object being to present the fluorine to the surface of the glass in a solid but comminuted condition, admixed with or adherent to the vehicle by which it is applied and retained in place on the surface of the glass. The vehicle must not only have the qualities before referred to, but should be composed of some organic substance which will char or burn away with the heat used in the process and leave the fluorine compound adherent to the glass in a thin film. The comminuted fluoride may be applied in admixture with the vehicle; or the vehicle may be first applied to the surface of the glass on the desired pattern, design, or lettering, and then the comminuted fluoride dusted upon it in sufficient quantity. The glassware thus prepared is then placed in a furnace or oven and exposed first to a low degree of heat sufficient to vaporize and remove the turpentine or other volatile or vaporizable ingredients of the vehicle. The heat is then gradually raised until the solid matter of the vehicle is charred or burned away. So far my process is coincident with that described in my other specification before referred to. The glass article under treatment is then exposed, in the same or some other furnace, to an atmosphere of hot vaporized sulphuric acid at any desired temperature not exceeding that which the glass will stand without becoming deformed and softening. The sulphuric acid may be vaporized by the heat of the furnace in which the glass is placed; or the hot acid vapor may be introduced from a special vaporizing-chamber. The effect of the hot sulphuric-acid vapor on the film of solid fluoride on the surface of the glass is to set in operation a reaction between the fluorine and the silica of the glass, which decomposes the glass, producing the desired etching effect. The presence of some amount of water or aqueous vapor in the oven is desirable for the reason that anhydrous sulphuric-acid vapor does not act well on fluorides. Usually the moisture of the atmosphere is sufficient; but it may be advisable to introduce a small amount of steam into the oven. It is not always necessary to employ a heat sufficient to burn off the vehicle by which the fluorides have been applied to the glass, because the sulphuric-acid vapor would itself decompose the vehicle; but in this case there would be danger of the lines of the design running together when the temperature of the oven is low, especially when the fluorides of the alkalies have been used. Phosphoric acid may, if desired, be used instead of the sulphuric acid, it being an equivalent therefor in this process, but it requires care in using it, as the vapor of phosphoric acid attacks the glass when a very high temperature is used.

This process does not produce as great opacity in the etching as the process described in my other specification before referred to, in which the glass article, after the varnish or other vehicle of the comminuted fluoride is burned away, is exposed to a heat a little below a dull red heat; but the process described in this specification has the advantage that it can be used in cases where, owing to the thinness of the glass to be etched, or for other reasons, it is not safe, or is not desired to expose the glass to such a degree of heat.

Having thus described my improvement, what I claim as my invention, and desire to secure by Letters Patent, is—

1. The process of etching glass by exposing articles of glassware, on which is previously deposited a film or layer of solid fluoride, to the action of heated vapor of sulphuric acid, or equivalent acid, for the purpose of producing a reaction between the fluorine and the silica of the glass, substantially as described.

2. The process of etching glassware by first applying to its surface, by means of a suitable vehicle, such as hereinbefore described, a quantity of solid fluoride of an alkali or alkaline earth, then exposing the glassware so prepared to a heat sufficient to vaporize the volatile ingredients and char or burn away the solid matter of the vehicle, leaving the fluoride deposited on the glass, and, lastly, producing a reaction between the fluorine so deposited and the silica of the glass by means of sulphuric acid or its equivalent in a vaporous condition, substantially as hereinbefore described.

In testimony whereof I have hereunto set my hand this 26th day of October, A. D. 1882.

HERMANN SCHULZE-BERGE.

Witnesses:
T. B. KERR,
W. B. CORWIN.